US006750574B2

(12) United States Patent
Okazaki et al.

(10) Patent No.: US 6,750,574 B2
(45) Date of Patent: Jun. 15, 2004

(54) MOTOR FOR USE WITH MOTORIZED POWER STEERING APPARATUS (75) Inventors: Masafumi Okazaki, Tokyo (JP); Yasuhide Yagyu, Tokyo (JP); Hideki Megata, Tokyo (JP); Tetsunao Takaki, Tokyo (JP); Shinsuke Henmi, Tokyo (JP); Satoru Akutsu, Tokyo (JP); Takeshi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,277

(22) Filed: Nov. 19, 2001

(65) Prior Publication Data
US 2002/0175574 A1 Nov. 28, 2002

(30) Foreign Application Priority Data

May 25, 2001 (JP) ........................ 2001-157435

(51) Int. Cl.[7] ........................... H02K 11/00; H02K 5/22
(52) U.S. Cl. ..................... 310/68 B; 310/89; 310/90
(58) Field of Search ................. 310/68 B, 71, 310/66, 68 R, 89, 90, 257

(56) References Cited

U.S. PATENT DOCUMENTS

| 3,558,940 | A | * | 1/1971 | Chestnut et al. ............ 310/41 |
| 4,982,125 | A | * | 1/1991 | Shirakawa ................ 310/68 B |
| 5,032,750 | A | * | 7/1991 | Hayashi .................. 310/68 B |
| 5,369,322 | A | * | 11/1994 | Maruyama et al. ......... 310/68 B |
| 5,770,902 | A | * | 6/1998 | Batten et al. ............... 310/71 |
| 5,793,132 | A | * | 8/1998 | Hirose et al. ............... 310/71 |
| 5,801,465 | A | * | 9/1998 | Yamada ..................... 310/71 |
| 5,866,962 | A | * | 2/1999 | Kim ....................... 310/68 B |
| 5,955,807 | A | * | 9/1999 | Kajiura et al. .......... 310/156.66 |
| 5,994,807 | A | * | 11/1999 | Coles et al. ................ 310/83 |
| 6,225,715 | B1 | * | 5/2001 | Hoda et al. .............. 310/68 B |
| 6,268,669 | B1 | * | 7/2001 | Wakao et al. ............ 610/68 B |
| 6,577,030 | B2 | * | 6/2003 | Tominaga et al. ........ 310/68 B |

FOREIGN PATENT DOCUMENTS

| JP | 07-023967 | 5/1995 |
| JP | 07-253079 | 10/1995 |
| JP | 09-002318 | 1/1997 |
| JP | 11-146600 | 5/1999 |
| JP | 2000-142431 | 5/2000 |
| JP | 2001-025187 | 1/2001 |
| JP | 2001-095201 | 4/2001 |

* cited by examiner

Primary Examiner—Burton S. Mullins
Assistant Examiner—J. Aguirrechea
(74) Attorney, Agent, or Firm—Sughrue Mion, PLLC (57) ABSTRACT A motor for use with a motorized power steering apparatus is provided in which the number of component members can be reduced, and workability in assembling the component members can be improved, while enabling miniaturization of the entire motor. The motor includes a bottomed cylindrical frame 31, a bracket 32 fixedly secured to the frame 31, a rotating element 8 having a shaft 7 rotatably supported by a frame side bearing 110 fixedly mounted on the frame 31 and a bracket side bearing 100 fixedly mounted on the bracket 32, a stationary element 6 fixedly attached to the frame 31 around an outer periphery of the rotating element 8 and having a stator winding 18 wound therearound, a rotation sensor 15 provided on the bracket 32 at a housing side of the bracket side bearing 100, and a plurality of sensor signal wires 38 for supplying and receiving signals to and from the rotation sensor 15.

13 Claims, 11 Drawing Sheets

PRIOR ART

FIG. 11

PRIOR ART

FIG. 12

PRIOR ART

FIG. 13

PRIOR ART

MOTOR FOR USE WITH MOTORIZED POWER STEERING APPARATUS

This application is based on Application No. 2001-157435, filed in Japan on May 25, 2001, the contents of which are hereby incorporated by reference.

BACKGROUND OF THE INVENTION

1. Field of the Invention

The present invention relates to a motor for use with a motorized power steering apparatus (hereinafter simply referred to as a motor) for assisting the steering force of a steering wheel of a vehicle.

2. Description of the Related Art

Figure 9:
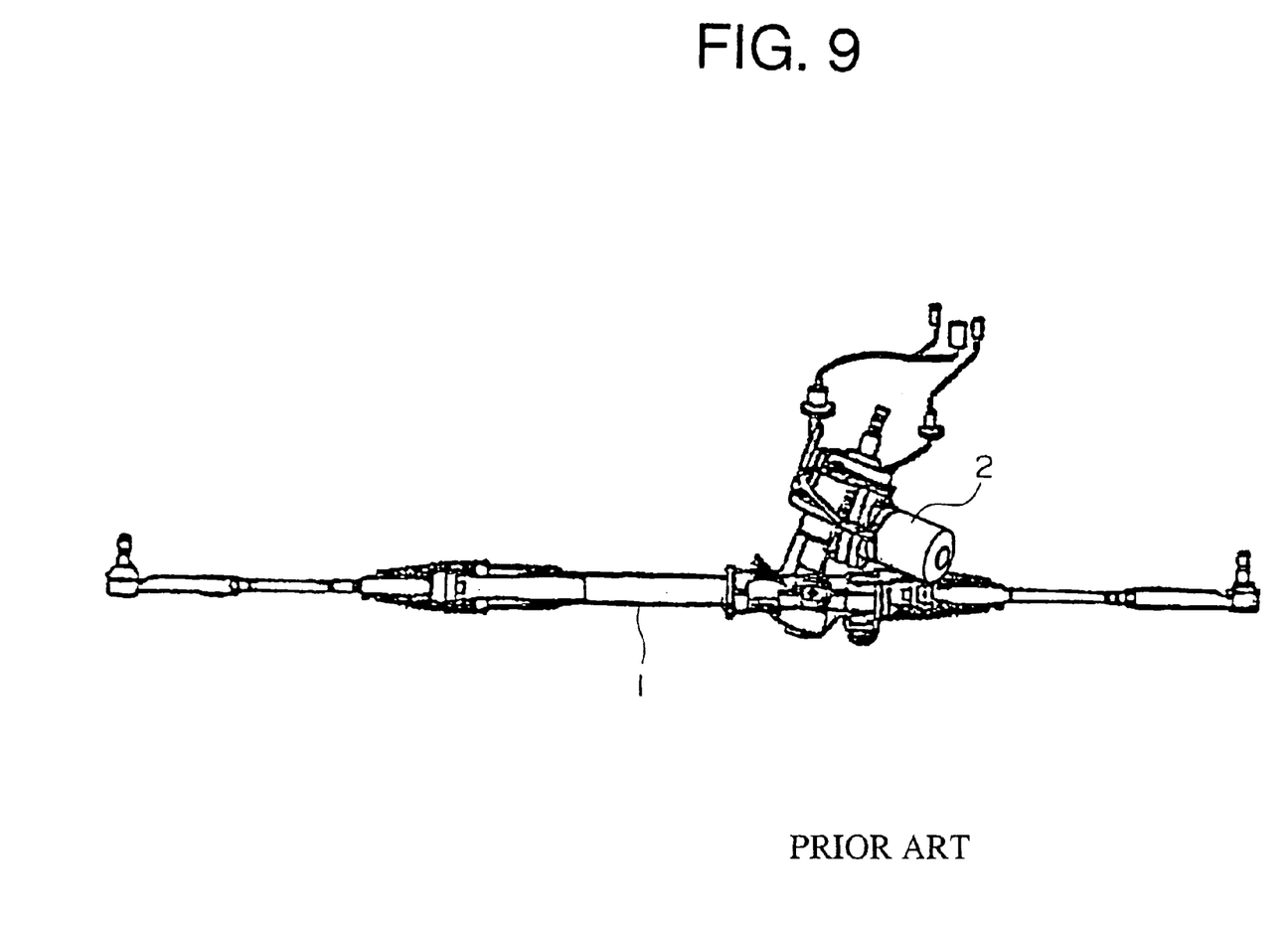
FIG. 9 is a perspective view of a motor for use with a motorized power steering apparatus arranged in the neighborhood of an axle.
Figure 10:
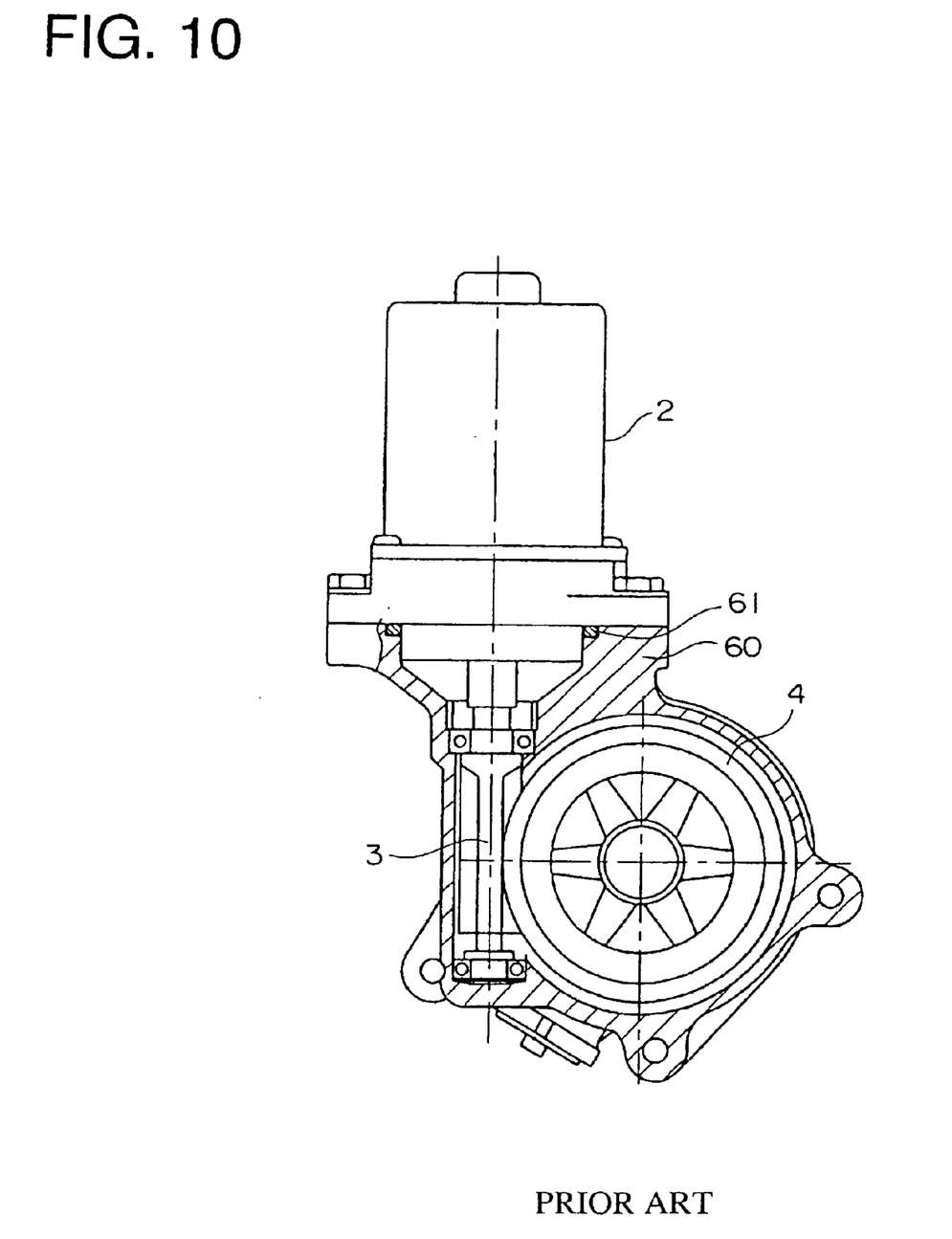
FIG. 10 is a partial cross sectional view illustrating the motor of FIG. 9 mounted on a gear housing.

FIG. 9 is a perspective view of a motor 2 arranged in the neighborhood of an axle 1. As shown in FIG. 10, a worm wheel 4 is in meshing engagement with a worm 3 connected with the motor 2. Accommodated in a housing 60 are the worm 3 and the worm wheel 4 for transmitting a steering force of the motor 2 to a steering wheel of a vehicle (not shown). An O ring 61 is disposed between the motor 2 and the housing 60 for ensuring sealing therebetween.

Figure 11:
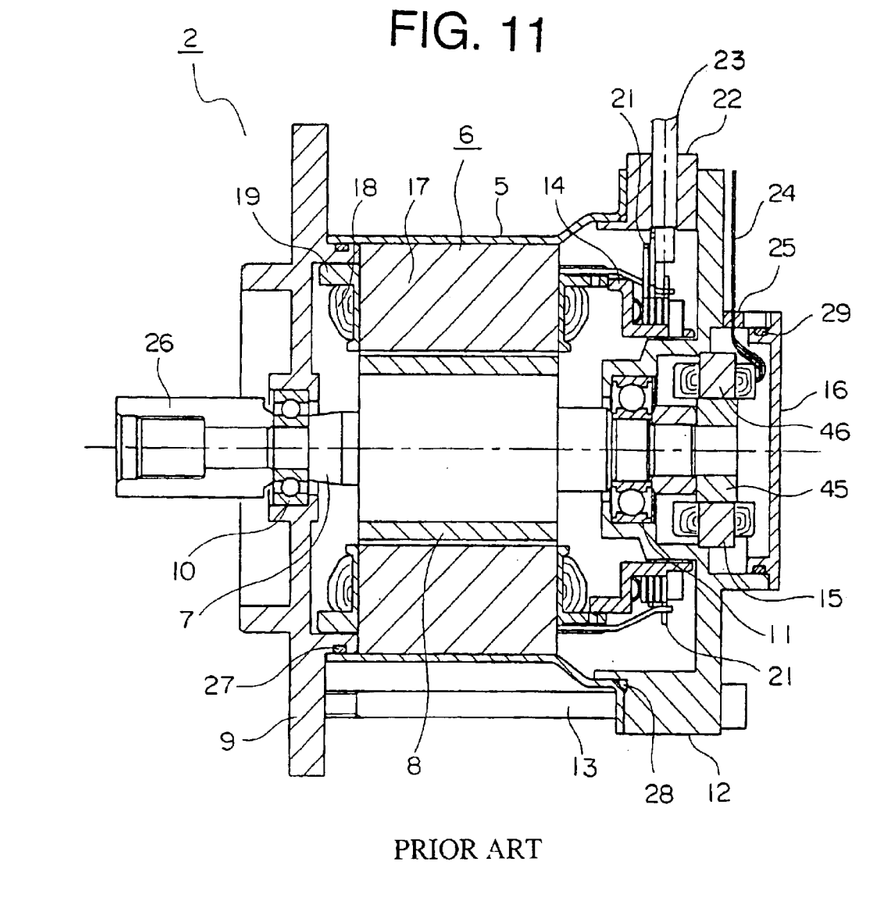
FIG. 11 is a cross sectional side view of a known motor for use with a motorized power steering apparatus.
Figure 12:
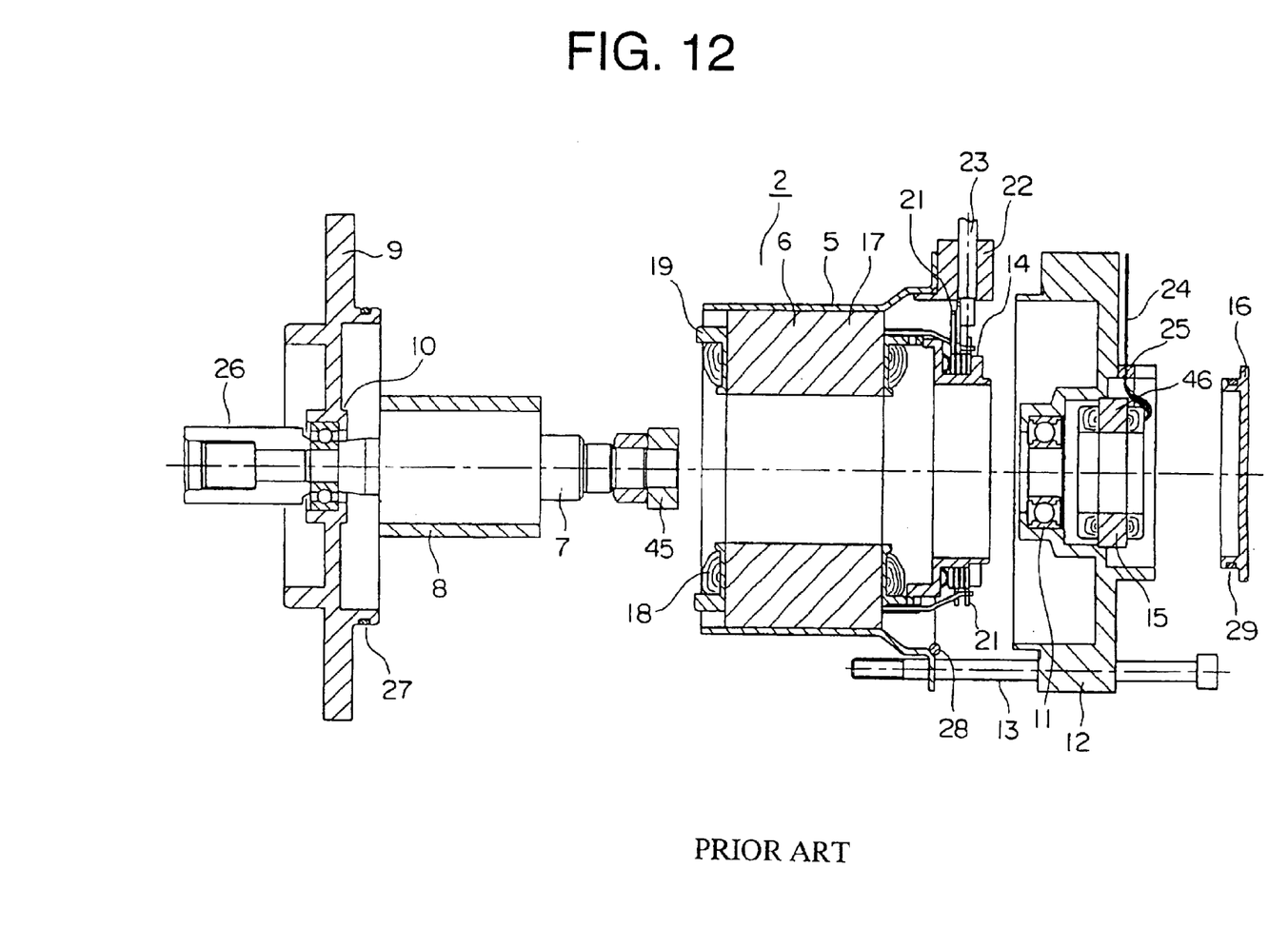
FIG. 12 is an exploded view of the motor of FIG. 11.

FIG. 11 is a cross sectional side view of a known motor 2. FIG. 12 is an exploded view of the motor 2 of FIG. 11. The motor 2 includes a frame 5 of a cylindrical shape, a stationary element 6 fixed to the frame 5, a rotating element 8 comprised of a shaft 7 and a cylindrical magnet having an N magnetic pole and an S magnetic pole, a front bracket 9 mounted on one side of the frame 5 with a load side (i.e., steering wheel side) bearing 10 fixedly secured to its central portion, a rear bracket 12 mounted on the other side of the frame 5 with a counter load side (i.e., counter steering wheel side) bearing 11 fixedly secured to its central portion, a fastening bolt 13 connecting between the rear bracket 12 and the front bracket 9, a wire connection board 14 provided on the outer periphery of the counter load side bearing 11, a rotation sensor 15 of the resolver type fixedly secured to the rear bracket 12 for detecting the rotational angle of the rotating element 8, and a waterproof cap 16 mounted on the rear bracket 12 for covering the rotation sensor 15.

The stationary element 6 includes a stator core 17 having a plurality of axially extending slots (not shown) formed in a circumferentially spaced apart relation with respect to one another, a stator winding 18 wound around the stator core 17, and a bobbin 19 provided between the stator core 17 and the stator winding 18.

The rotation sensor 15 includes an oval-shaped rotor 45 fixed to an end portion of the shaft 7, and a stator 46 provided on the outer periphery of the rotor 45. The rotation sensor 15 is connected with a plurality of sensor signal wires 24 which penetrate through a grommet 25.

The wire connection board 14 has four doughnut-shaped stator side respective phase terminals 21. The stator side respective phase terminals 21 are connected with respective phase lead wires 23 of a U phase, a V phase and a W phase, which penetrate through a lead wire grommet 22.

With the motor 2 as constructed above, current flows from the respective phase lead wires 23 of the U phase, V phase and W phase to the stator winding 18, so that a rotating field is given to the stator winding 18, thereby causing the rotating element 8 to rotate. The rotating force of the shaft 7 is transmitted to the worm 3, which is spline connected with a boss 26 formed an end of the shaft 7, and thence to the worm wheel 4 in mesh with the worm 3, thereby assisting the steering effort of an operator applied to the steering wheel.

In the known motor 2, the outer peripheral portion of the motor 2 is constituted by the rear bracket 12 with the rotation sensor 15 fixedly mounted thereon, the frame 5 with the stationary element 6 fixed thereto, the front bracket 9 with the load side bearing 10 fixedly mounted thereon, and the waterproof cap 16. Thus, the motor 2 includes a lot of component members, and hence there arises a problem that the number of working processes of assembling the respective members with each other as well as the number of O rings 27, 28 and 29 arranged between the respective members increases.

Moreover, the stator side respective phase terminals 21 of the wire connection board 14 extend in a diametrical or radial direction, thus giving rise to another problem in that the diametrical or radial dimensions of the motor 2 become large.

In addition, there is also a further problem that each of the stator side respective phase terminals 21 is of a thin plate configuration, and there is only a narrow working space for directly connecting the respective phase lead wires 23 with the stator side respective phase terminals 21 through welding or the like, thus making the connecting work rather difficult.

Besides, there is a yet further problem that many sensor signal wires 24 are inserted into and extended through the grommet 25, and hence workability in inserting the sensor signal wires 24 into the grommet 25 is poor.

Figure 13:
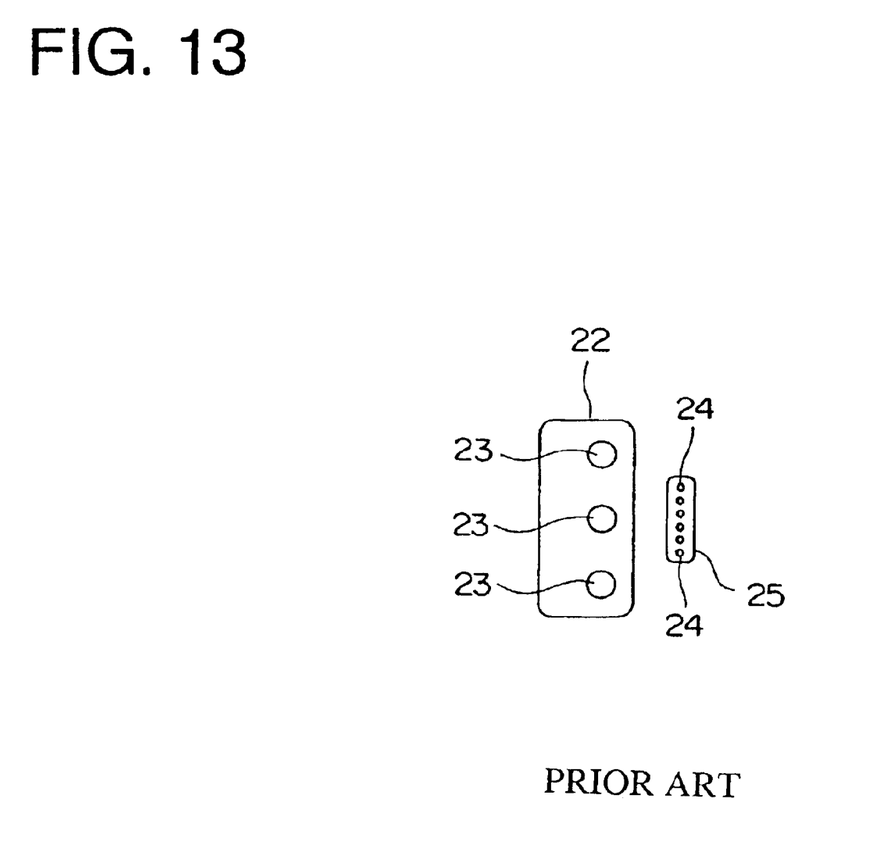
FIG. 13 is a plan view of a grommet of FIG. 11.

Still further, an additional problem is that separate formation of the grommet 25, through which the sensor signal wires 24 extend, and the grommet 22, through which the respective phase lead wires 23 extend, as illustrated in FIG. 13, accordingly increases the number of component members.

SUMMARY OF THE INVENTION

The present invention is intended to obviate the various problems as referred to above, and has for its object to provide a motor for use with a motorized power steering apparatus in which the number of component members can be reduced, and workability in assembling the component members can be improved, while enabling miniaturization of the entire motor.

Bearing the above object in mind, the present invention resides in a motor for use with a motorized power steering apparatus, including a frame of a bottomed cylindrical shape having an opening formed therein, a bracket fixed to the opening in the frame, a rotating element extending through the bracket and having a shaft rotatably supported by a frame side bearing fixedly mounted on the frame and a bracket side bearing fixedly mounted on the bracket, a stationary element fixedly attached to the frame at a location around an outer periphery of the rotating element and having a stator winding wound therearound, a rotation sensor provided on the bracket at one side of the bracket side bearing near a gear housing for detecting a rotational angle of the rotating element, and a plurality of sensor signal wires connected with the rotation sensor for supplying and receiving signals to and from the rotation sensor.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. The following explanation will be made by identifying the same or equivalent members or parts of the present invention with the same symbols as those employed in the above-mentioned known motor.

Embodiment 1.

Figure 1:
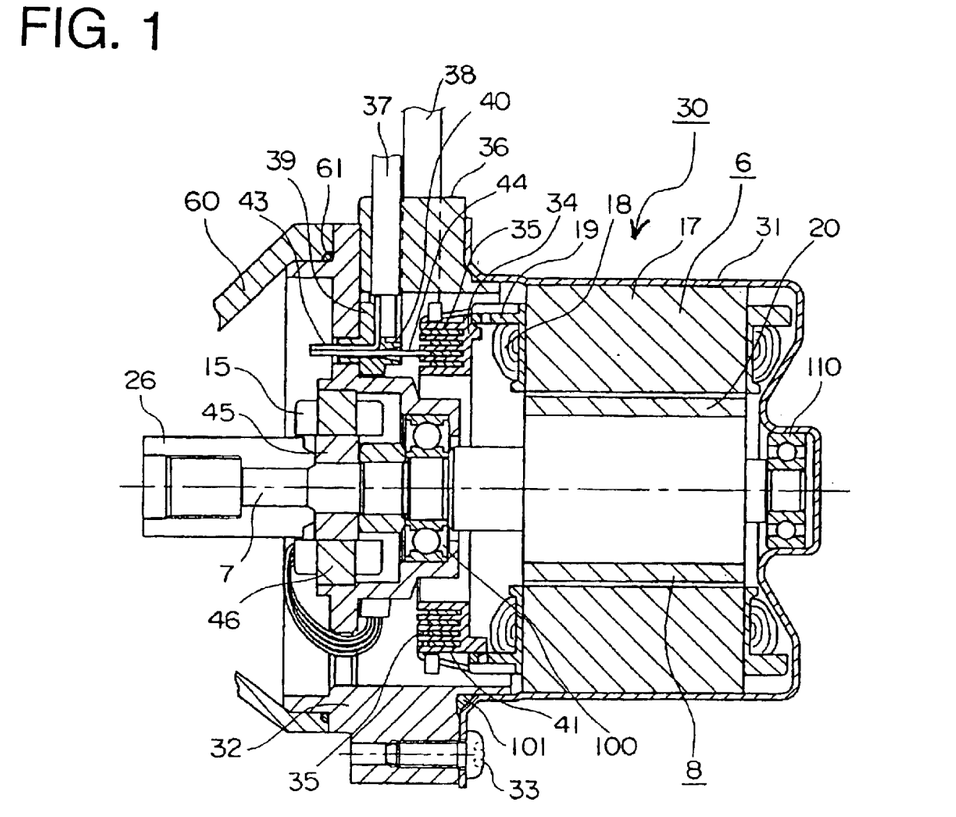
FIG. 1 is a cross sectional side view of a motor for use with a motorized power steering apparatus according to a first embodiment of the present invention.
Figure 2:
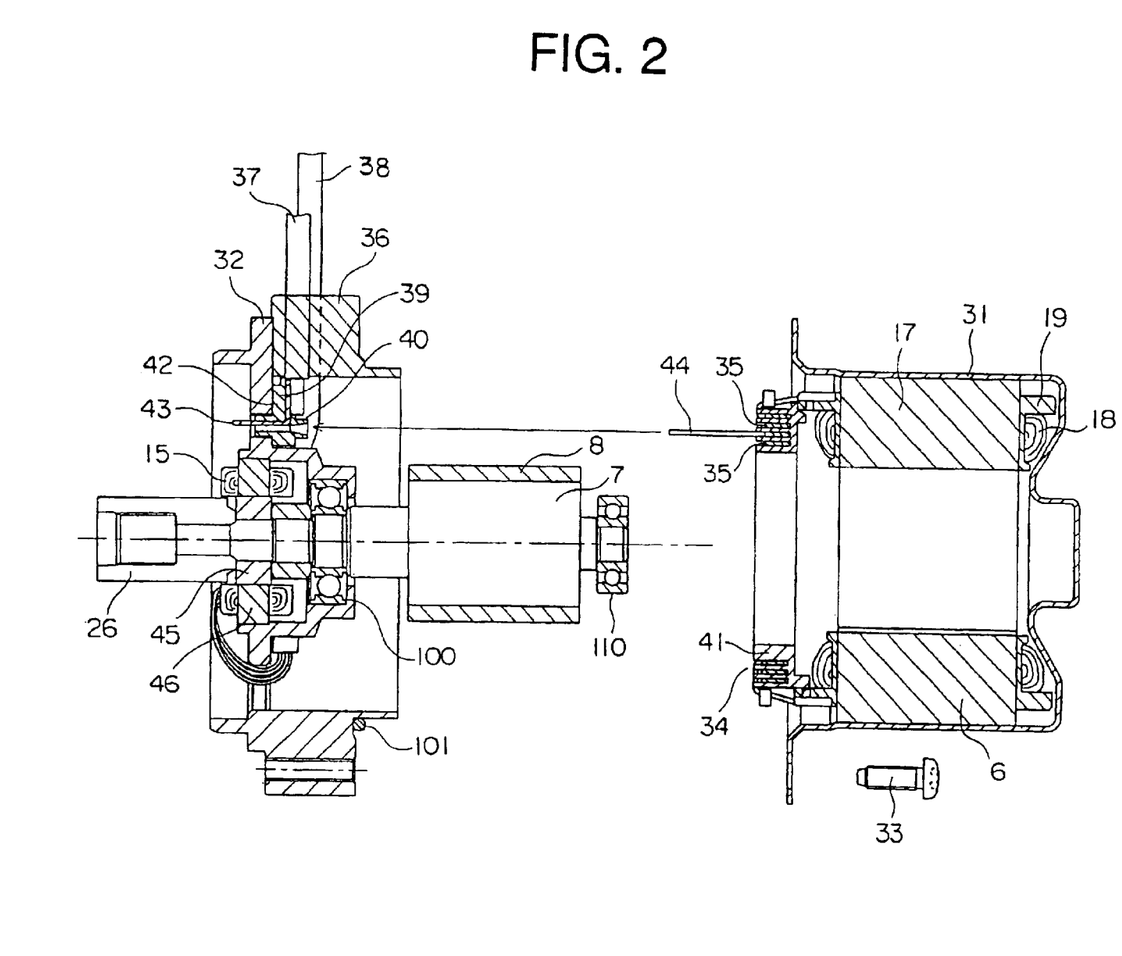
FIG. 2 is an exploded view of the motor of FIG. 1.
Figure 3:
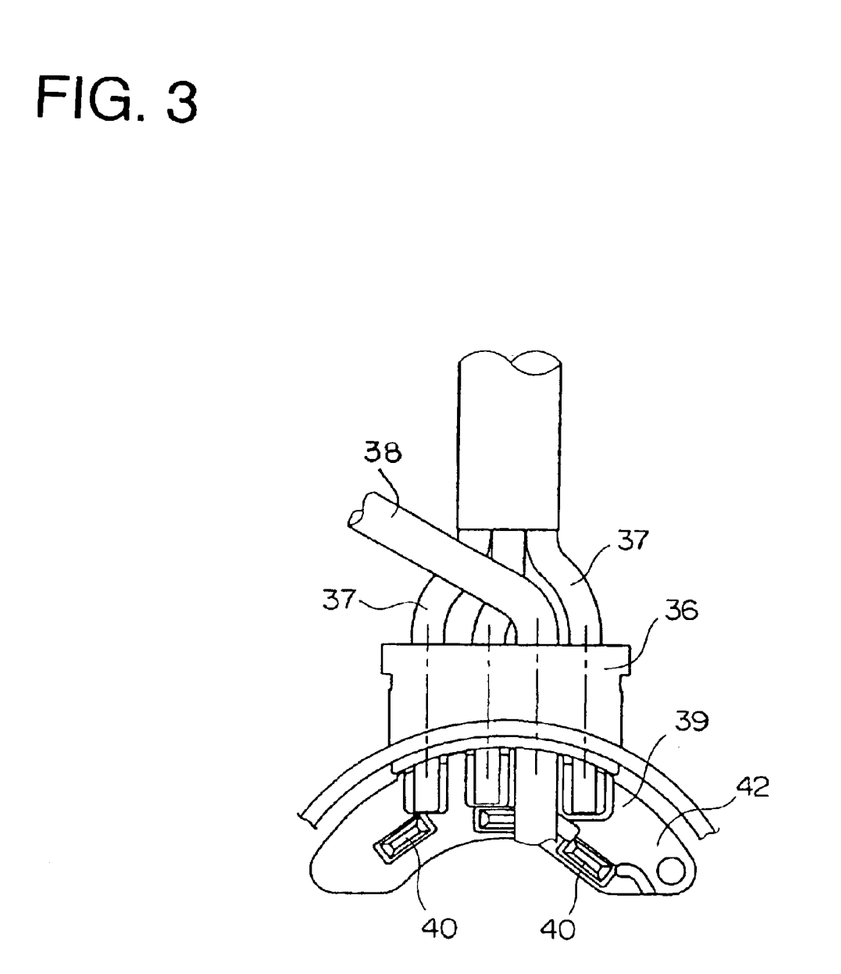
FIG. 3 is a front elevation of a connection plate of FIG. 1.
Figure 4:
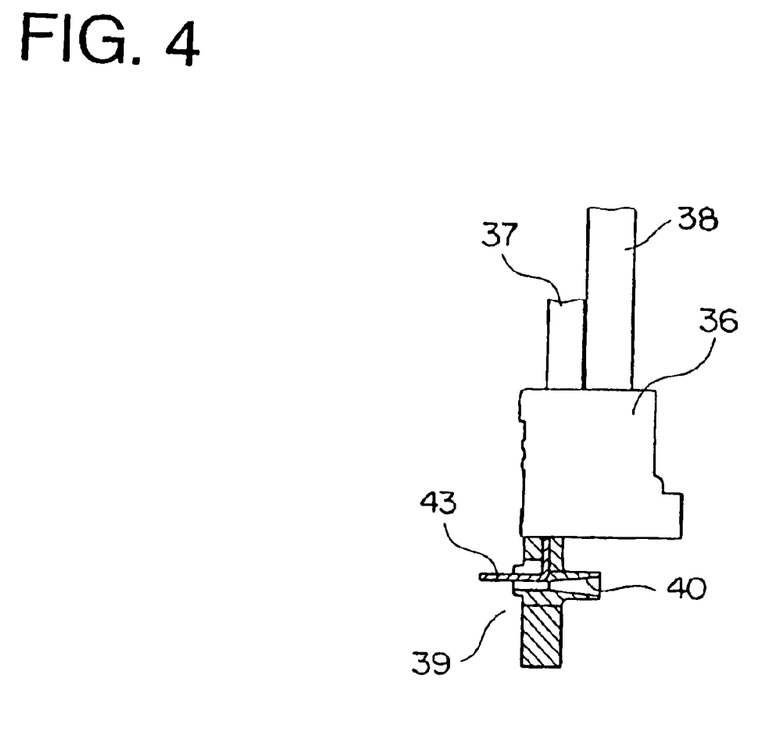
FIG. 4 is a cross sectional view of essential portions of the connection plate of FIG. 3.
Figure 5:
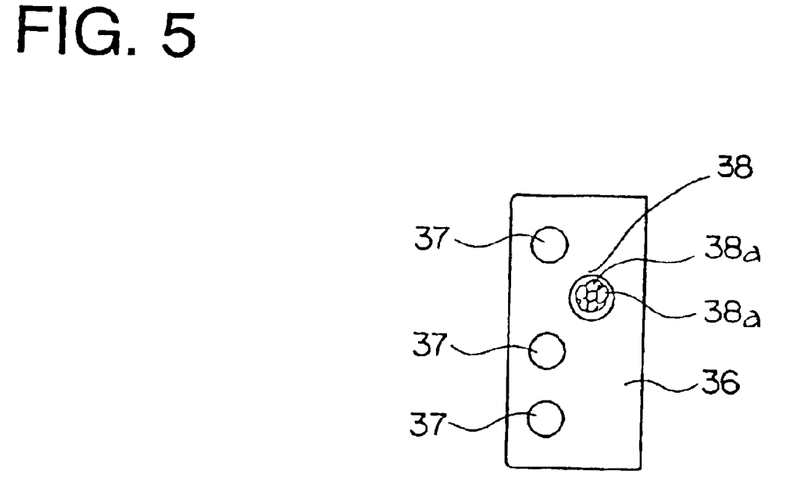
FIG. 5 is a plan view of a grommet of FIG. 1.

FIG. 1 illustrates, in vertical section, an overall construction of a motor for use with a motorized power steering apparatus, generally designated at 30, which is hereinafter simply referred to as a motor. FIG. 2 illustrates an exploded or disassembled state of the motor 30 of FIG. 1. FIG. 3 illustrates a connection plate 39 of FIG. 1. FIG. 4 illustrates essential portions of the connection plate 39 of FIG. 3. FIG. 5 illustrates a grommet 36 of FIG. 1.

The motor 30 includes a frame 31 of a bottomed cylindrical shape, a stationary element 6 fixedly secured to the frame 31, a rotating element 8 comprised of a shaft 7 and a cylindrical magnet having an N magnetic pole and an S magnetic pole, a bracket 32 fixedly secured to a peripheral edge of the frame 31 by means of bolts 33, a rotation sensor 15 of the resolver type fitted into the bracket 32, a bracket side bearing 100 fitted into the bracket 32, a frame side bearing 110 fixedly fitted into a recessed portion of the bottom of the frame 31, a wire connection board 34 fixedly mounted on the stationary element 6 at its one side near the bracket side bearing 100, respective phase lead wires 37 and a sensor signal cable 38, which contains a plurality of bundled sensor signal wires 38a, extending through a grommet 36, and a connection plate 39 connecting between the respective phase lead wires 37 and the wire connection board 34.

The stationary element 6 includes a stator core 17 having a plurality of axially extending slot (not shown) formed in a circumferentially spaced apart relation with respect to one another, a stator winding 18 wound around the stator core 17, and a bobbin 19 arranged between the stator core 17 and the stator winding 18.

The rotation sensor 15 includes an oval-shaped rotor 45 fixedly mounted on the shaft 7, and a stator 46 arranged on the outer periphery of the rotor 45.

The wire connection board 34 includes a holder 41 having grooves formed therein, and rotor side respective phase terminals 35 of a U phase, a V phase and a W phase received in the respective grooves in the holder 41. The rotor side respective phase terminals 35 are connected with the stator winding 18. The rotor side respective phase terminals 35 each take a beltshaped configuration when developed into a plane, and a circular configuration when received in the respective grooves.

The connection plate 39 includes a base 42 having a plurality of (e.g., three in the illustrated example) tapered insertion openings 40 each formed to expand toward their open end, and lead wire side respective terminals 43 adapted to be connected with corresponding connection portions 44 respectively projecting in an axial direction from the rotor side respective phase terminals 35.

With the motor 30 as constructed above, first of all, the rotating element 8 with the bracket side bearing 100 and the frame side bearing 110 fixed thereto is mounted on the bracket 32. Thereafter, the respective phase lead wires 37 are connected through welding with the lead wire side respective terminals 43 of the connection plate 39. Then, the connection plate 39 is fixedly attached to the bracket 32 by means of a fastening member such as a screw. Subsequently, the frame 31 with the stationary element 6 fixed thereto is fixedly secured to the bracket 32 by means of bolts 33. In this case, the connection portions 44 of the rotor side respective phase terminals 35 are inserted into the corresponding insertion openings 40 of the base 42, whereby the rotor side respective phase terminals 35 and the lead wire side respective terminals 43 come in contact with each other through the connection portions 44. Thereafter, the tip ends of the rotor side respective phase terminals 35 and the tip ends of the corresponding lead wire side respective terminals 43 are connected with each other through welding.

The motor 30 thus assembled is then fixedly mounted to the housing 60, in which a worm, a worm wheel 4 in mesh therewith, etc., are accommodated, by fastening the bracket 32 to the housing 60 by means of bolts.

Here, note that the rotation sensor 15 is arranged outside the bracket side bearing 100, and hence the positional adjustment of the stator 46 can be carried out even after assembling of the motor 30 into the housing 60.

With the motor 30 of the above-mentioned construction, current flows from the respective phase lead wires 37 to the stator winding 18 through the lead wire side respective terminals 43 and the corresponding rotor side respective phase terminals 35, whereby a rotating field is given to the stator winding 18, causing the rotating element 8 to rotate. The rotating force of the shaft 7 of the rotating element 8 is transmitted to a steering wheel (not shown) through a worm 3, a worm wheel 4, which is splined to a boss 26 formed at one end portion of the shaft 7, and a worm wheel 4 in mesh with the worm 3 thereby to assist the steering force or effort exerted to the steering wheel by an operator.

Moreover, the magnetic field of the stator 46 is caused to change in accordance with the rotation of the oval-shaped rotor 45, and the value of the changing magnetic flied is output as a voltage through the sensor signal wires 38a in the sensor signal cable 38, so that the rotational angle of the rotating element 8 can be detected.

With the motor 30 of the above-mentioned construction, the essential portions thereof are covered with the bottomed cylindrical frame 31 and the bracket 32. In addition, since the rotation sensor 15 arranged outside the bracket 32 is covered with the housing 60, a rear bracket 12 and a waterproof cap 16 (see FIGS. 11 and 12) used in the known motor become unnecessary, thus reducing the number of component members as compared with the known motor. As a result, the working process of assembling these members as well as O rings 28, 29 (see FIGS. 11 and 12) therebetween are omitted.

Moreover, since the rotor side respective phase terminals 35 are arranged around the shaft 7 like multiple concentric rings in a circumferentially spaced apart relation with respect to one another, the dimensions in the diametrical or radial direction of the motor 30 can be reduced.

In addition, the respective phase lead wires 37 are connected with the corresponding rotor side respective phase terminals 35 through the lead wire side respective terminals 43 of the connection plate 39, so that the work of connecting between the lead wire side respective terminals 43 and the connection portions 44 of the rotor side respective phase terminals 35 can be carried out outside the bracket 32, thus improving workability in welding these terminals.

Further, since each of the insertion openings 40 is of a tapered configuration, it is possible to smoothly insert the connection portions 44 into the insertion openings 40.

Embodiment 2.

Figure 6:
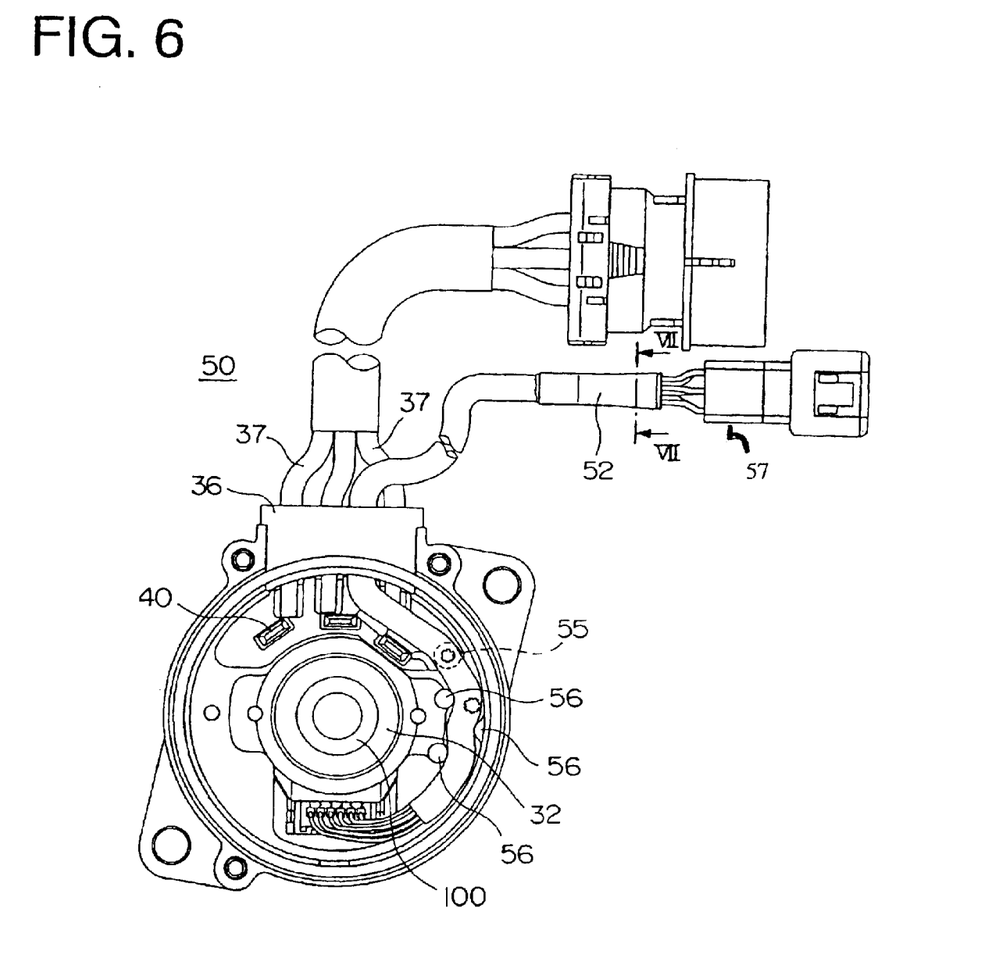
FIG. 6 is a front elevation illustrating a bracket side internal structure of a motor for use with a motorized power steering apparatus according to a second embodiment of the present invention.
Figure 7:
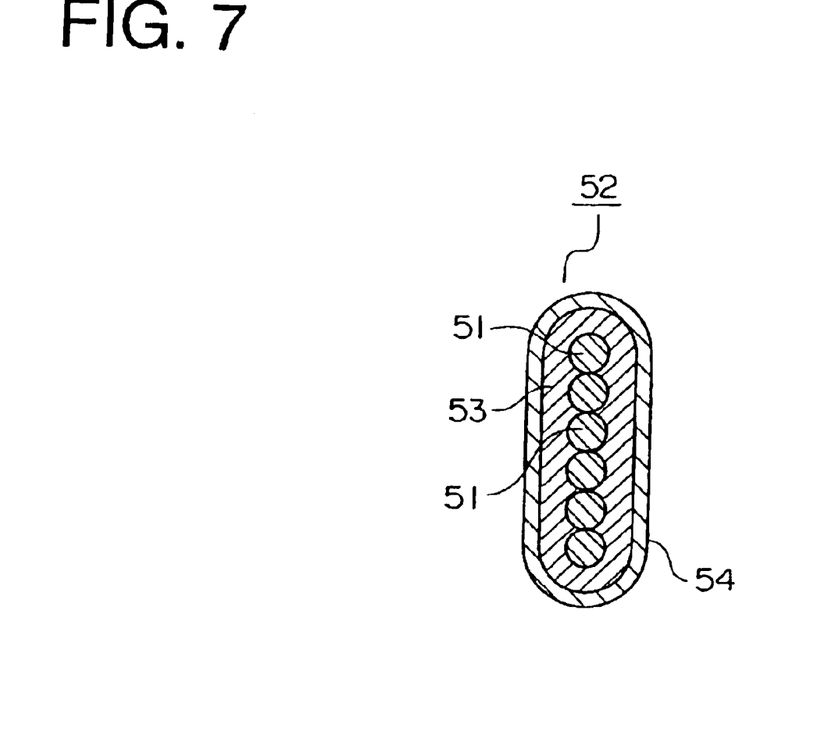
FIG. 7 is a cross sectional view of a multi-wire cable taken along line VII—VII of FIG. 6.

FIG. 6 illustrates an internal structure of a motor 50 at the side of a bracket 32 according to a second embodiment of the present invention. FIG. 7 illustrates a multi-wire cable 52 in cross section taken along line VII—VII of FIG. 6.

In this embodiment, at a connector side end of the multi-wire cable 52 at which the cable 52 is connected with a connector 57, sensor signal wires 51 each coated with an insulation film are encased or covered on their periphery with a waterproof heat shrinkable tube 54 with a sealing material 53 filled therein to combine the sensor signal wires 51 with each other and hold them in their fixed positions, as shown in FIG. 7.

Figure 8:
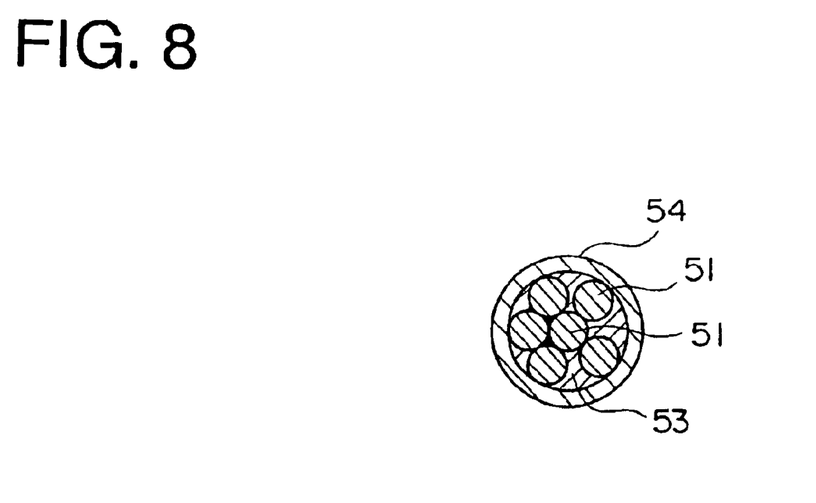
FIG. 8 is a cross sectional view illustrating another example of a multi-wire cable.

The signal wires 51 in the multi-wire cable 52 are arranged substantially in a row. In this connection, it is to be noted that in cases where the signal wires 51 are arranged in such a manner that one of them is positioned at the center and surrounded by the remaining ones, as shown in FIG. 8, the sealing material 53 is not able to reach the central signal wire and fill its surrounding space to any satisfactory extent. In contrast to this, however, the multi-wire cable 52 of this embodiment arranged in the above manner as shown in FIG. 7 does have sufficient sealing material 53 surrounding the central signal wire.

Moreover, in this embodiment, the multi-wire cable 52 is arranged over a fastening member in the form of a screw 55, which fastens the connection plate 39 to the bracket 32, and hence the multi-wire cable 52 acts to urge the screw 55 in the axial direction, thereby preventing the screw 55 from falling off from the connection plate 39. Here, note that the bracket 32 is formed with a plurality of protrusions 56 between which the multi-wire cable 52 is arranged in a clamping manner. Thus, the multi-wire cable 52 is guided to pass over the fastening member such as the screw 55 by means of these protrusions 56.

Although in the above embodiments, the rotational angle of the rotating element 8 is detected by using the rotation sensor 15 of the resolver type, the present invention is not limited to this, but the rotation sensor may instead be comprised of a magnet mounted on the shaft 7, and a Hall IC or a magnetoresistive (MR) element arranged around the outer periphery of the magnet for detecting a change in the magnetic field of the magnet.

As described in the foregoing, the present invention provide the following advantages.

According to the present invention, a motor for use with a motorized power steering apparatus includes a frame of a bottomed cylindrical shape having an opening formed therein, a bracket fixed to the opening in the frame, a rotating element extending through the bracket and having a shaft rotatably supported by a frame side bearing fixedly mounted on the frame and a bracket side bearing fixedly mounted on the bracket, a stationary element fixedly attached to the frame at a location around an outer periphery of the rotating element and having a stator winding wound therearound, a rotation sensor provided on the bracket at one side of the bracket side bearing near a gear housing for detecting a rotational angle of the rotating element, and a plurality of sensor signal wires connected with the rotation sensor for supplying and receiving signals to and from the rotation sensor. With this construction, the essential portions of the motor are covered with the bottomed cylindrical frame and the bracket, and the rotation sensor disposed outside the bracket is also covered with the housing. As a result, in comparison with the aforementioned known motor, a rear bracket and a waterproof cap as conventionally required become unnecessary. Thus, the number of component members is reduced, and the working process for assembling the respective members with one another as well as seal members between the respective members can also be reduced.

In a preferred form of the present invention, the rotation sensor includes a stator fixedly secured to the bracket and a rotor fixedly secured to the shaft, wherein a change in the magnetic field of the stator caused in accordance with rotation of the rotor is detected for sensing the rotational angle of the rotating element. Thus, the rotational angle of the rotating element can be detected with a simple construction.

In another preferred form of the present invention, a wire connection board is provided at one side of the stationary element near the bracket side bearing, and the wire connection board is connected with the stator winding and has annular stator side respective phase terminals arranged concentrically around the shaft of the rotating element in a radially spaced apart relation with respect to one another. With this arrangement, the dimensions in a diametrical direction of the motor can be reduced.

In a further preferred form of the present invention, a connection plate is provided on the bracket, and the connection plate has a base and lead wire side respective terminals fixedly secured to the base. The lead wire side respective terminals is connected with connection portions, which extend in an axial direction from the stator side respective phase terminals, and with respective phase lead wires, which serve to supply current to the stator winding. With this arrangement, the work of connecting between the lead wire side respective terminals and the connection portions of the rotor side respective phase terminals can be carried out outside the bracket, thereby improving workability in welding thereof.

In a yet further preferred form of the present invention, the base is formed with insertion openings each in the shape of a tapered configuration expanding toward an open end thereof, and the connection portions have their ends inserted into the corresponding insertion openings, respectively. Thus, the connection portions can be smoothly inserted into the corresponding insertion openings.

In a still further preferred form of the present invention, the plurality of sensor signal wires are bundled together to form a multi-wire cable. Thus, workability in inserting the signal wires into a grommet is improved.

In a further preferred form of the present invention, the respective sensor signal wires are combined with one another by a sealing material and covered on their outer periphery with a waterproof heat shrinkable tube at one end of the multi-wire cable at which the multi-wire cable is connected with a connector. Thus, the waterproofness of the multi-wire cable is improved.

In a further preferred form of the present invention, the respective sensor signal wires at their ends connected with the connector are arranged substantially in a raw. With such an arrangement, nearly the whole periphery of each sensor signal wire is surrounded by the sealing material, so sealing performance of the multi-wire cable is improved.

In a further preferred form of the present invention, the multi-wire cable passes over a fastening member, which fastens the connection plate to the bracket, so that it pushes the fastening member such as a screw, thus preventing it from falling off.

In a further preferred form of the present invention, the multi-wire cable is clamped between a plurality of protrusions formed on the bracket so as to be positioned in place, whereby the multi-wire cable is stably held on the bracket without fluctuations.

In a further preferred form of the present invention, the respective phase lead wires and the multi-wire cable are arranged to extend through a single grommet. Thus, use of only one grommet is sufficient for these wires, serving to further reduce the number of component members and simplify the construction as well.

While the invention has been described in terms of preferred embodiments, those skilled in the art will recognize that the invention can be practiced with modifications within the spirit and scope of the appended claims.

What is claimed is:

1. A motor for use with a motorized power steering apparatus in which said motor is fixedly secured to a housing having a gear accommodated therein for transmitting a torque of said motor to a steering wheel, said motor comprising:
    a frame of a bottomed cylindrical shape having an opening formed therein;
    a bracket fixed to said opening in said frame;
    a rotating element extending through said bracket and having a shaft rotatably supported by a frame side bearing fixedly mounted on said frame a bracket side bearing fixedly mounted on said bracket;
    a stationary element fixedly attached to said frame at a location around an outer periphery of said rotating element and having a stator winding wound therearound;
    a rotation sensor provided on said bracket at one side of said bracket side bearing near said housing for detecting a rotational angle of said rotating element, said rotation sensor of the resolver type comprising a rotor fixedly mounted on said shaft and a stator arranged on the periphery of said rotor; and
    a plurality of sensor signal wires connected with said rotation sensor for supplying and receiving signals to and from said rotation sensor.

2. The motor according to claim 1, wherein said rotation sensor comprises a stator fixedly secured to said bracket and a rotor fixedly secured to said shaft, wherein a change in the magnetic field of said stator caused in accordance with rotation of said rotor is detected for sensing the rotational angle of said rotating element.

3. The motor according to claim 2, wherein positional adjustment of the stator can be carried out even after assembling of the motor.

4. The motor according to claim 2, further comprising a wire connection board provided at one side of said stationary element near said bracket side bearing, said wire connection board being connected with said stator winding and having annular stator side respective phase terminals arranged concentrically around said shaft of said rotating element in a radially spaced apart relation with respect to one another.

5. The motor according to claim 4, further comprising a connection plate provided on said bracket, said connection plate having a base and lead wire side respective terminals fixedly secured to said base, said lead wire side respective terminals being connected with connection portions, which extend in an axial direction from said stator side respective phase terminals, and with respective phase lead wires, which serve to supply current to said stator winding.

6. The motor according to claim 5, wherein said base is formed with insertion openings each in the shape of a tapered configuration expanding toward an open end thereof, and said connection portions have their ends inserted into said corresponding insertion openings, respectively.

7. The motor according to claim 1, wherein said plurality of sensor signal wires are bundled together to form a multi-wire cable.

8. The motor according to claim 7, wherein said multi-wire cable passes over a fastening member which fastens said connection plate to said bracket.

9. The motor according to claim 7, wherein said multi-wire cable is clamped between a plurality of protrusions formed on said bracket so as to be positioned in place.

10. The motor according to claim 7, wherein said respective sensor signal wires are combined with one another by a sealing material and covered on their outer periphery with a waterproof heat shrinkable tube at one end of said multi-wire cable which is connected with a connector.

11. The motor according to claim 10, wherein said respective sensor signal wires at their at their ends connected with said connector are arranged in a row.

12. The motor according to claim 1, wherein said respective phase lead wires and said multi-wire cable extend through a single grommet.

13. The motor according to claim 1, wherein the rotation sensor is disposed so as to be covered by the housing.

* * * * *